(12) United States Patent
Pal et al.

(10) Patent No.: US 9,178,400 B2
(45) Date of Patent: Nov. 3, 2015

(54) COOLING ARRANGEMENT FOR A MOTOR ASSEMBLY AND METHOD OF COOLING A MOTOR ASSEMBLY

(71) Applicants: Debabrata Pal, Hoffman Estates, IL (US); Mustansir Hussainy Kheraluwala, Lake Zurich, IL (US); Eric Alan Carter, Monroe, WI (US); Robert Scott Downing, Rockford, IL (US); Charles Patrick Shepard, DeKalb, IL (US)

(72) Inventors: Debabrata Pal, Hoffman Estates, IL (US); Mustansir Hussainy Kheraluwala, Lake Zurich, IL (US); Eric Alan Carter, Monroe, WI (US); Robert Scott Downing, Rockford, IL (US); Charles Patrick Shepard, DeKalb, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 638 days.

(21) Appl. No.: 13/626,485

(22) Filed: Sep. 25, 2012

(65) Prior Publication Data

US 2014/0232219 A1 Aug. 21, 2014

(51) Int. Cl.
*H02K 9/19* (2006.01)
*H02K 9/06* (2006.01)
*H02K 9/18* (2006.01)
*H02K 11/00* (2006.01)
*B64D 33/08* (2006.01)

(52) U.S. Cl.
CPC .. *H02K 9/19* (2013.01); *H02K 9/06* (2013.01); *H02K 9/18* (2013.01); *H02K 11/0073* (2013.01); *B64D 33/08* (2013.01)

(58) Field of Classification Search
CPC ........................................... H02K 9/19
USPC ................... 310/52, 54, 58, 59; 361/698–723
See application file for complete search history.

(56) References Cited

U.S. PATENT DOCUMENTS

| | | | | |
|---|---|---|---|---|
| 5,517,072 A | * | 5/1996 | Hildebrandt | 310/228 |
| 5,954,258 A | * | 9/1999 | Baader et al. | 226/188 |
| 6,624,542 B1 | * | 9/2003 | Gabrys et al. | 310/54 |
| 6,877,210 B2 | * | 4/2005 | Hsu | 29/598 |
| 7,525,224 B2 | * | 4/2009 | Takenaka et al. | 310/54 |
| 7,633,193 B2 | * | 12/2009 | Masoudipour et al. | 310/54 |
| 7,796,389 B2 | * | 9/2010 | Edmunds et al. | 361/700 |
| 2007/0069593 A1 | * | 3/2007 | Vasilescu et al. | 310/54 |
| 2010/0006264 A1 | * | 1/2010 | Jadric et al. | 165/104.19 |

\* cited by examiner

*Primary Examiner* — Thomas Truong
(74) *Attorney, Agent, or Firm* — Cantor Colburn LLP

(57) ABSTRACT

A cooling arrangement for a motor assembly includes a motor operably connected to a load. Also included is a motor controller disposed adjacent to, and fluidly coupled to, the motor, the motor controller disposed within a housing enclosing a cooling fluid for immersion of a plurality of motor controller components. Further included is a duct arrangement configured to route a cooling flow to a location proximate the housing of the motor controller for cooling therealong.

7 Claims, 5 Drawing Sheets

COOLING ARRANGEMENT FOR A MOTOR ASSEMBLY AND METHOD OF COOLING A MOTOR ASSEMBLY

BACKGROUND OF THE INVENTION

The present invention relates to a motor assembly, and more particularly to a cooling arrangement for the motor assembly, as well as a method of cooling the motor assembly.

Motor assemblies utilizing ram air flow are employed in a variety of applications, with one such application being an aircraft. The ram air flow in an aircraft may serve various purposes, such as in cooling systems for the aircraft. For example, the ram air flow may be utilized to remove heat from various aircraft lubrication and electrical systems and/or be used to condition aircraft cabin air. When the aircraft is in flight, the movement of the aircraft creates a sufficient source of ram air flow which can be used for the purposes described above. When the aircraft is on the ground or is operating at low speeds, however, a fan is typically utilized to supply air flow to the cooling systems. Such a fan is driven by an electric motor which, in turn, must be cooled by air flowing across it. The electric motor is controlled by a motor controller that is typically disposed at a location remote from the electric motor and the ram air fan, such as in a remote rack with other controllers and/or electrical components. Both the electric motor and the motor controller require cooling to maintain effective operation. Ineffective cooling of these components may lead to failure or inefficient operation. Additionally, the remote location of the motor controller and the electric motor require distinct and excessive cooling sources and flows.

Cooling of the motor controller with the fan by locating the motor controller in close proximity to the fan also introduces undesirable effects, as fans, especially ram air fans, are located such that they draw air from the harsh ambient. Harsh in this regard describes the presence of moisture, water, corrosive substances, aircraft cleaning liquid, foreign objects, etc. The motor controllers typically require forced air cooling through the motor controller. Use of air from harsh ambient can thereby result in reduced reliability and result in shortened time between failures for such co-located motor controller.

BRIEF DESCRIPTION OF THE INVENTION

According to one embodiment, a cooling arrangement for a motor assembly includes motor operably connected to a load. Also included is a motor controller disposed adjacent to, and fluidly coupled to, the motor, the motor controller disposed within a housing enclosing a cooling fluid for immersion of a plurality of motor controller components. Further included is a duct arrangement configured to route a cooling flow to a location proximate the housing of the motor controller for cooling therealong.

According to another embodiment, a method of cooling a motor assembly is provided. The method includes routing a main flow into a conduit. Also included is extracting a cooling flow from at least a portion of the main flow from the conduit to a duct arrangement in fluid communication with the conduit. Further included is routing the cooling flow through the duct arrangement to a location proximate a motor controller disposed adjacent a motor. Yet further included is cooling the motor controller during routing of the cooling flow along an outer surface of a housing of the motor controller. Also included is expelling the cooling flow to a motor located adjacent the motor controller for cooling of the motor.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
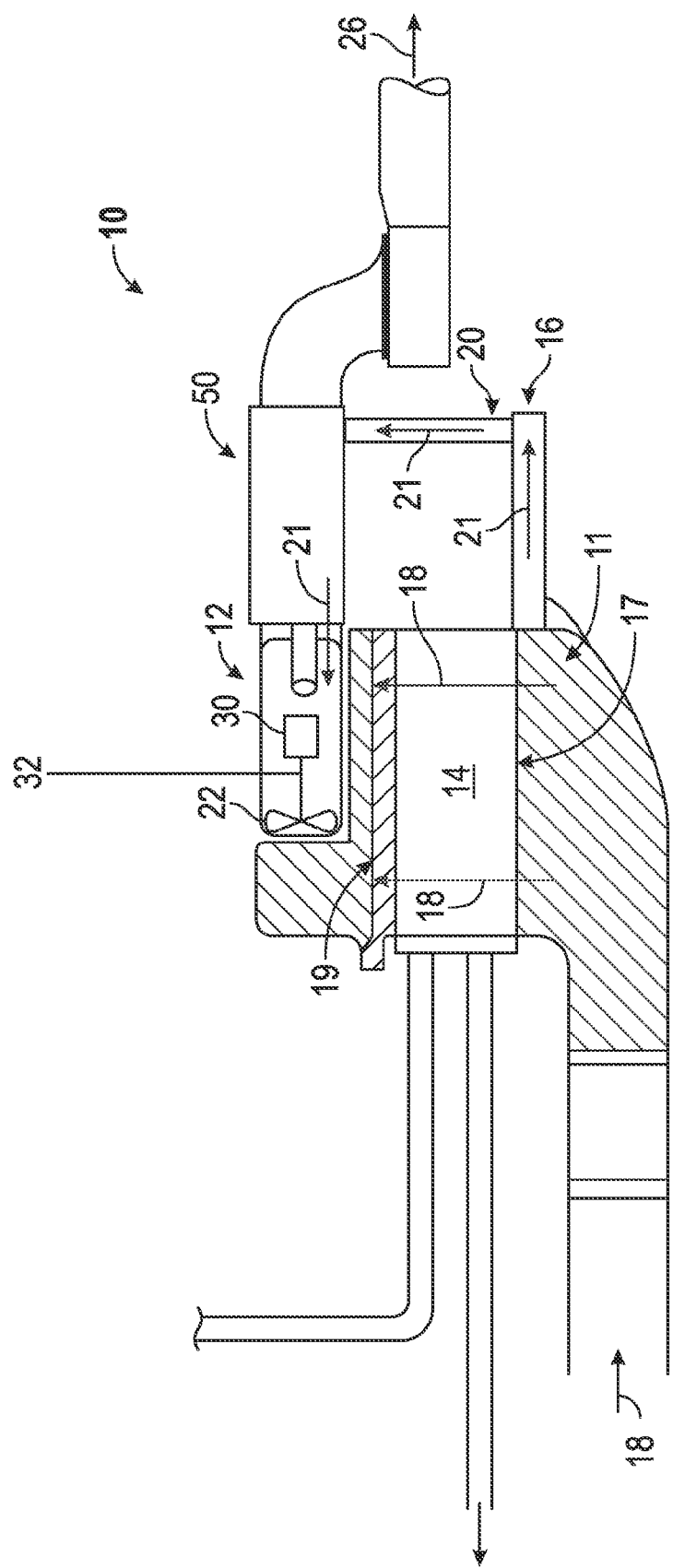
FIG. 1 is a schematic illustration of a motor assembly.
Figure 2:
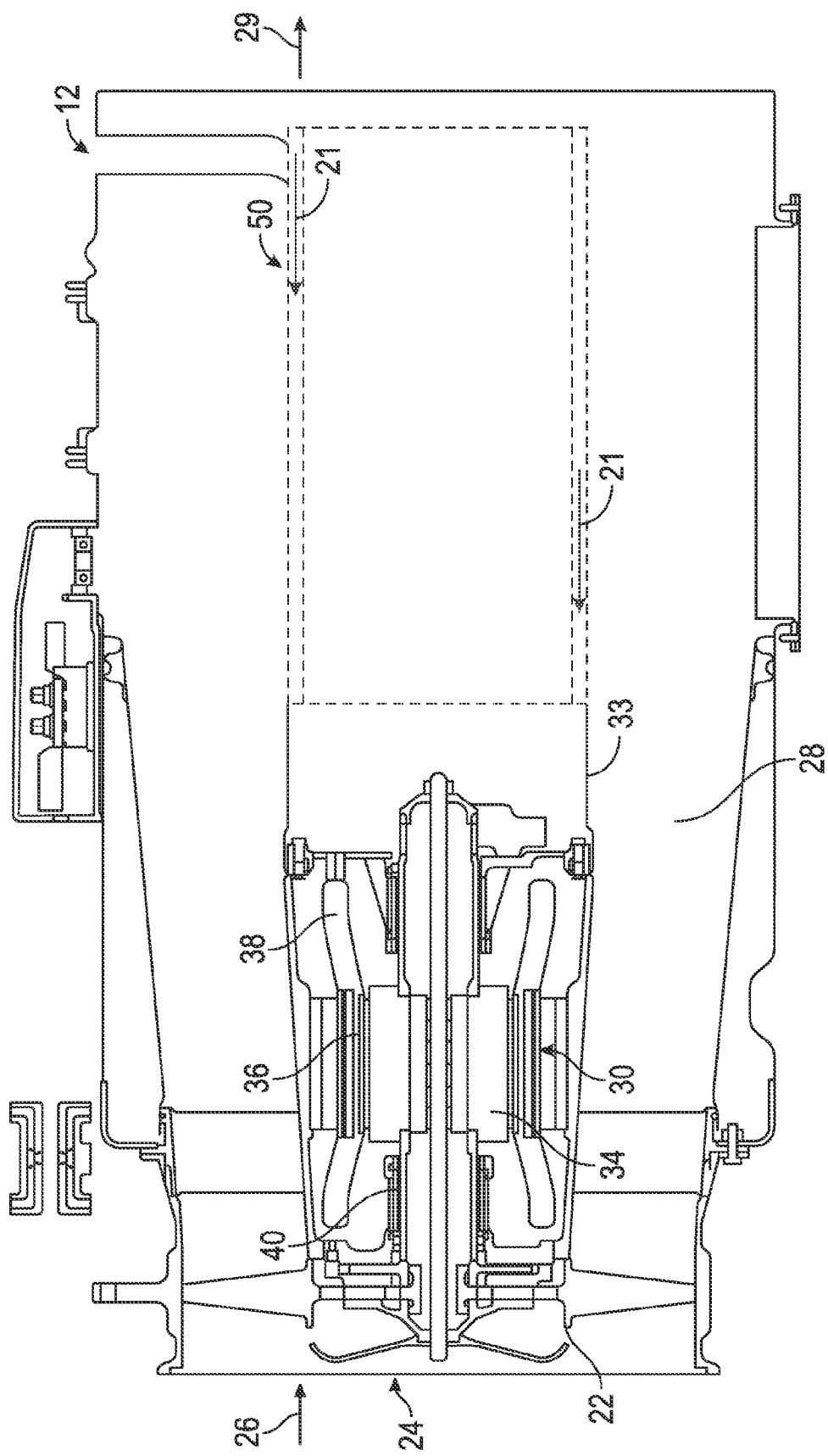
FIG. 2 is an enlarged schematic illustrating the motor assembly in greater detail.

Referring to FIGS. 1 and 2, a portion of a cooling system 10 is schematically illustrated. The cooling system 10 described herein may be used in conjunction with an assembly or system of a vehicle, such as an aircraft, however, it is contemplated that other vehicles may benefit from the embodiments described herein. The cooling system 10 includes a motor assembly 12 and a heat exchanger 14 disposed in close proximity thereto. The motor assembly 12 may be employed to drive a variety of contemplated loads and in the exemplary embodiment, the load is a ram air fan 22. The heat exchanger 14 is configured to ingest a fluid, such as a main flow 18. The main flow 18 may be sourced from ambient air through a conduit 11 and is drawn into the heat exchanger 14 through a heat exchanger inlet 17 via a pressure drop across the heat exchanger 14. Subsequently, the main flow is expelled via a heat exchanger outlet 19. A cooling arrangement 16 is generally illustrated and includes a duct arrangement 20 in fluid communication with the conduit 11 and configured to route at least a portion of the main flow 18 to the motor assembly 12. The routed portion of the main flow 18 is routed as a cooling flow 21 to the motor assembly 12.

The motor assembly 12 includes the ram air fan 22 disposed proximate a fan inlet 24. A ram air flow 26 flows into the fan inlet 24 and through a fan passage 28 for cooling of various components and systems via a fan outlet 29. The ram air fan 22 is operably connected to a ram air fan motor 30 via at least one shaft 32. The ram air fan motor 30, located in a motor housing 33, is an electric motor having a rotor 34 rotatably located proximate the at least one shaft 32, and a stator 36 having a plurality of stator windings 38 disposed radially outboard of the rotor 34. The ram air fan motor 30 is controlled by a ram air fan motor controller 50 (shown in phantom) disposed relatively adjacent to the ram air fan motor 30. The ram air fan motor 30 also includes at least one bearing 40 disposed proximate the at least one shaft 32. The ram air fan 22 driven by the ram air fan motor 30 is configured to urge additional air flow through the fan inlet 24 when natural airflow into the fan inlet 24 is not sufficient to meet the requirements of the aircraft. To prevent overheating of the ram air fan motor 30, particularly the stator windings 38 and the at least one bearing 40, cooling of these components is desirable.

Figure 3:
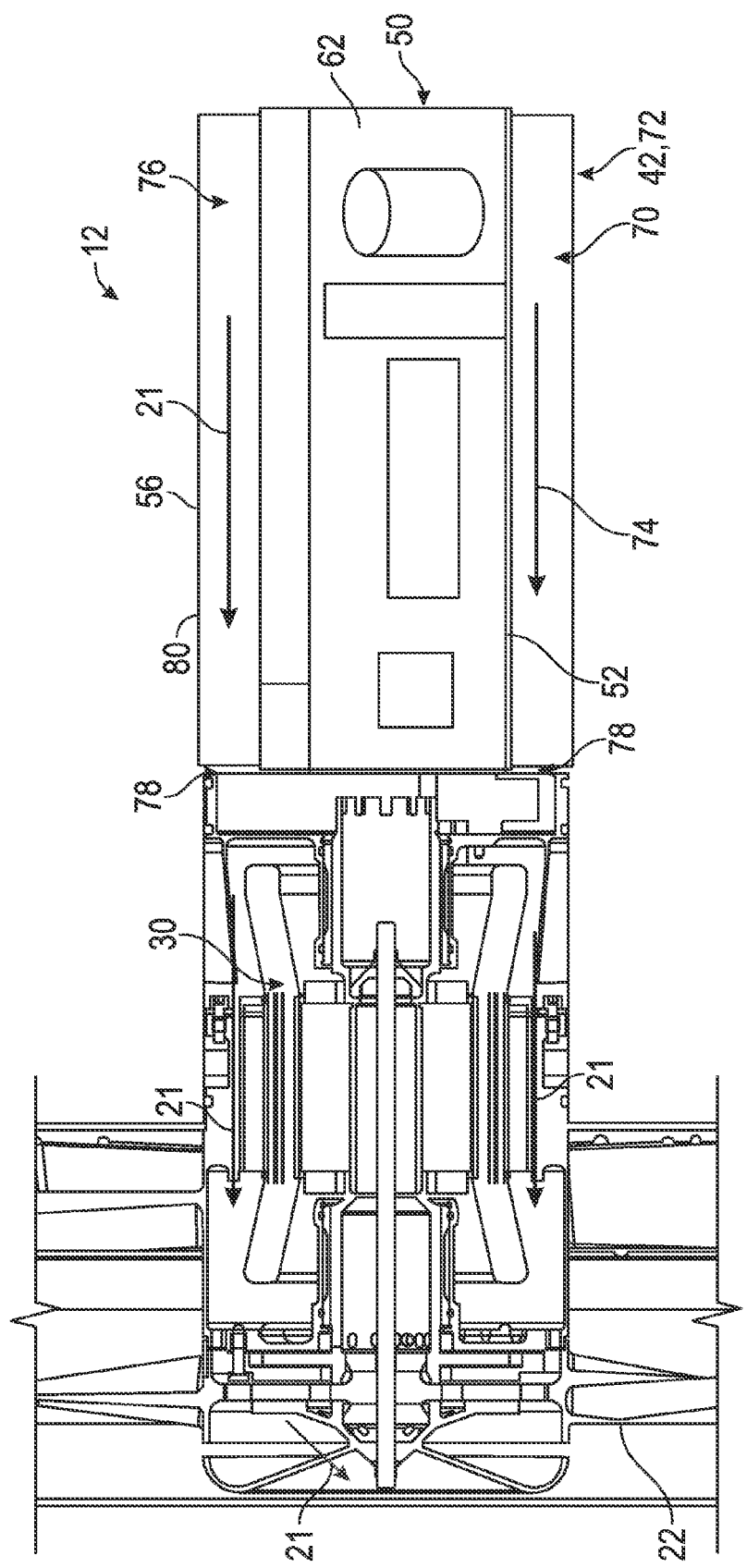
FIG. 3 is a schematic of the motor assembly illustrating a liquid-immersion cooled motor controller disposed adjacent a motor.
Figure 4:
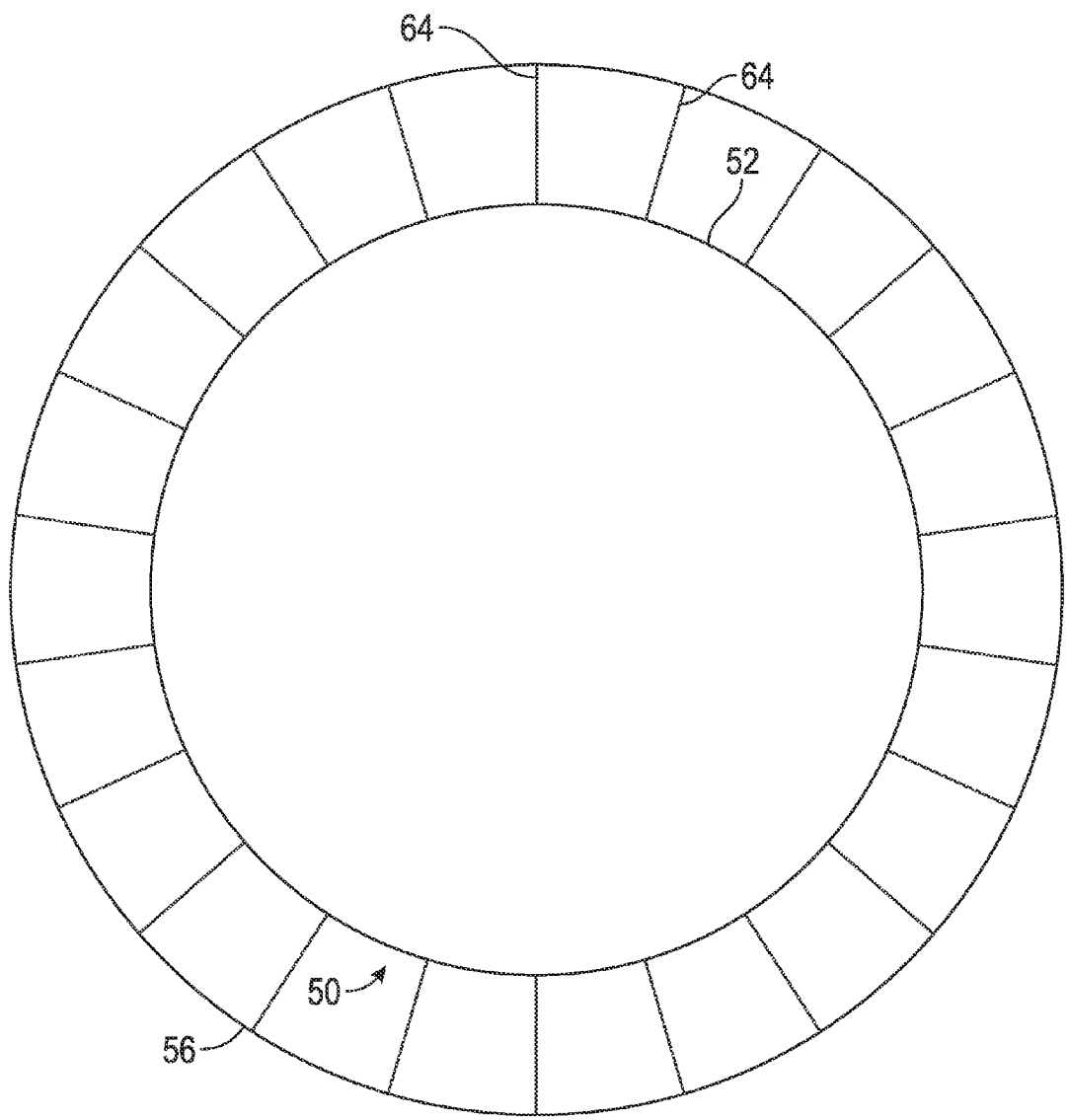
FIG. 4 is a cross-sectional view of the motor controller according to one embodiment.

Referring now to FIGS. 3 and 4, although it is contemplated that the cooling flow 18 may be routed to a plurality of locations of the motor assembly 12, in an exemplary embodiment the cooling flow 21 is routed to a location proximate an upstream end 42 of the ram air fan motor controller 50. The terms "upstream" and "downstream" are used herein to refer to a predominant direction of flow of the cooling flow 21. As will be described in detail below, the cooling flow 21 flows proximate the ram air fan motor controller 50 and subsequently the ram air fan motor 30 for cooling therealong.

The ram air fan motor controller 50 comprises a housing 52 for enclosing a plurality of ram air fan motor controller components for controlling the ram air fan motor 30. The housing 52 may be of various cross sectional geometries, including the illustrated circular or tubular geometry, however, numerous other geometries are contemplated, such as rectangular, for example. Irrespective of the precise geometric configuration of the housing 52, a cooling fluid 62 is disposed within an interior region of the housing 52 for immersing the plurality of ram air fan motor controller components disposed therein. The cooling fluid 62 may be any fluid suitable for cooling of electrical components, such as a dielectric immersion cooling fluid. Fluorocarbon liquids are an example of such a fluid, an in an exemplary embodiment FC-72 is employed within the housing 52. Cooling of the plurality of ram air fan motor controller components comprises a two-phase immersion cooling, as the phase change from liquid to vapor provides efficient cooling.

The housing 52 also includes a plurality of condenser fins 64 extending radially outwardly from the housing 52. The housing 52 is surrounded by or comprises a condenser 70 that is configured to receive the cooling flow 21 and is employed to condense the above-described vapor as the cooling flow 21 passes over the plurality of condenser fins 64. As noted above, the cooling flow 21 is routed to an upstream end 42 of the ram air fan motor controller 50 and in the illustrated embodiment the cooling flow 21 is routed to an upstream region of the condenser 70 through a cooling flow inlet 72. The cooling flow 21 is then routed in a downstream direction 74 within an annulus 76 formed by the housing 52 and a duct liner 56. Subsequent to cooling of the ram air fan motor controller 50, the cooling flow 21 is routed through a cooling flow outlet 78 located proximate a downstream end 80 of the condenser 70 and the housing 52. The cooling flow 21 is routed to the ram air fan motor 30, which is located at a downstream, adjacent location relative to the ram air fan motor controller 50.

Advantageously, the above-described structure provides an integrated and closely disposed motor assembly 12. By locating the ram air fan motor controller 50 in close proximity to the ram air fan motor 30, a single source and path of the cooling flow 21 may be employed to efficiently cool both the ram air fan motor controller 50 and the ram air fan motor 30. Additionally, the ram air fan motor controller 50 electronics are less prone to failure due to cooling efforts based on immersion cooling of the ram air fan motor controller 50 electronics that are sealed from the external harsh atmosphere. Rather, the condenser fins 64 are exposed to ambient air, thereby alleviating the need for forced air flow to the fan motor controller electronics. In this manner, this ram air fan motor controller 50 can be operated in a harsh environment.

Figure 5:
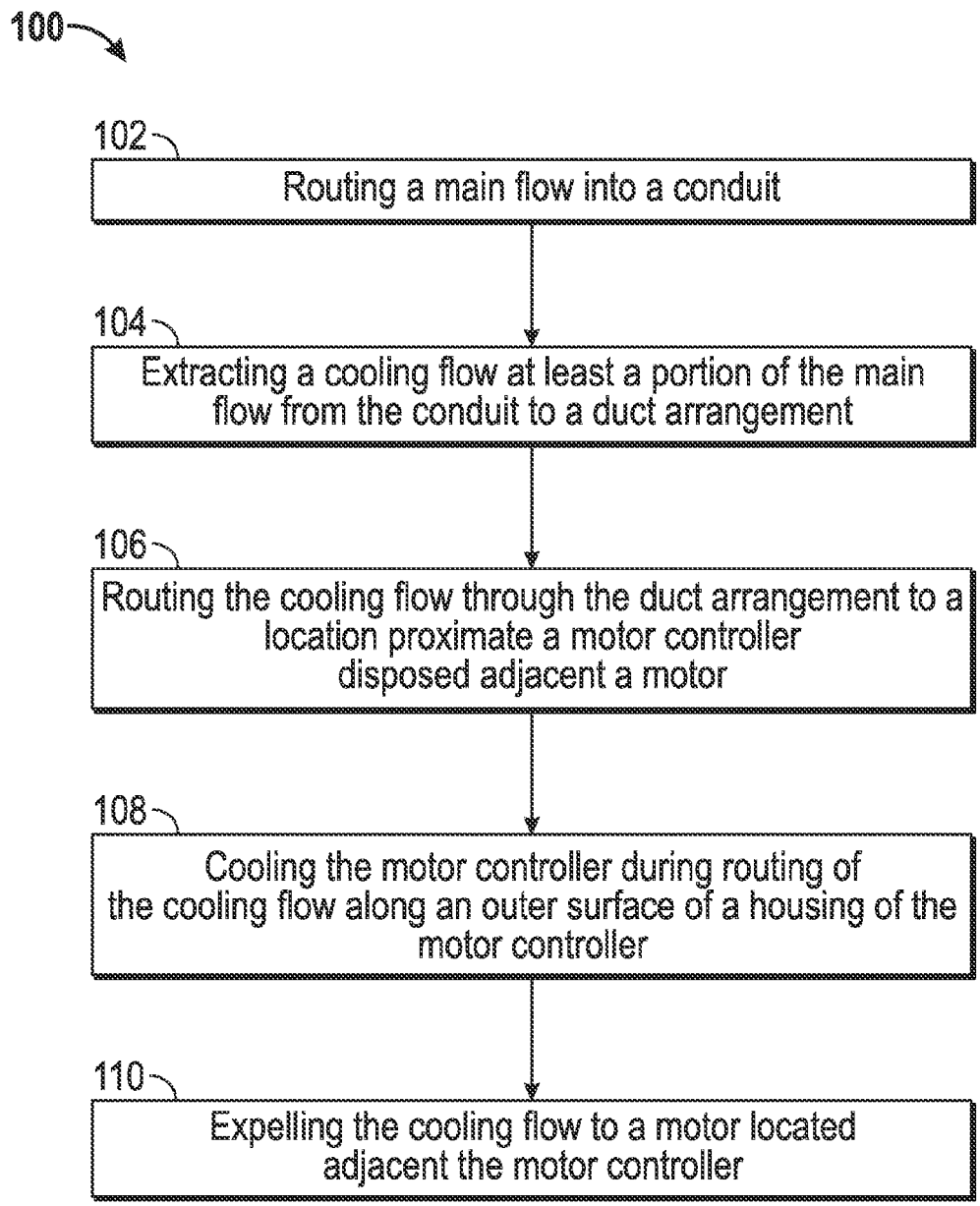
FIG. 5 is a flow diagram illustrating a method of cooling the motor assembly.

A method of cooling a motor assembly 100 is also provided as illustrated in FIG. 5 and with reference to FIGS. 1-4. The motor assembly 12 has been previously described and specific structural components need not be described in further detail. The method for cooling a motor assembly 100 includes routing a main flow into a conduit 102 and extracting a cooling flow from at least a portion of the main flow from the conduit to a duct arrangement in fluid communication with the conduit 104. The cooling flow is routed through the duct arrangement to a location proximate a motor controller disposed adjacent to a motor 106. The motor controller is cooled during routing of the cooling flow along an outer surface of a housing of the motor controller 108. The cooling flow is then expelled to a motor located adjacent the motor controller for cooling of the motor 110.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooling arrangement for a motor assembly comprising:
    a motor operably connected to a load;
    a motor controller disposed adjacent to, and fluidly coupled to, the motor, the motor controller disposed within a housing enclosing a cooling fluid for immersion of a plurality of motor controller components;
    a duct liner located radially outwardly of an outer surface of the housing and defining an annulus therebetween;
    a condenser disposed within the annulus and comprising a plurality of condenser fins extending from the outer surface of the housing;
    a duct arrangement configured to route a cooling flow to a cooling flow inlet disposed at an upstream end of the annulus for receiving the cooling flow for cooling of the motor controller; and
    a cooling flow outlet disposed at a downstream end of the annulus for routing the cooling flow along the motor, the cooling flow comprises vapor ingested into the duct arrangement.

2. The cooling arrangement of claim 1, the load comprising a fan driven by the motor.

3. The cooling arrangement of claim 1, further comprising a conduit for ingesting a main flow for routing to a heat exchanger.

4. The cooling arrangement of claim 3, wherein the duct arrangement is in operable communication with the conduit for ingesting at least a portion of the main flow as the cooling flow.

5. The cooling arrangement of claim 1, the housing comprising a circular geometry.

6. The cooling arrangement of claim 1, the cooling fluid comprising a dielectric immersion cooling fluid.

7. The cooling arrangement of claim 1, the cooling fluid comprising a fluorocarbon liquid.

\* \* \* \* \*